US006667600B2

(12) United States Patent
Fogleman

(10) Patent No.: US 6,667,600 B2
(45) Date of Patent: Dec. 23, 2003

(54) ELECTRICAL SYSTEM AUXILIARY POWER OUTLET ARRANGEMENT AND METHOD OF USING SAME

(76) Inventor: H. Frank Fogleman, Box 612, Rancho Santa Fe, CA (US) 92067

( * ) Notice: Subject to any disclaimer, the term of this patent is extended or adjusted under 35 U.S.C. 154(b) by 125 days.

(21) Appl. No.: 10/038,836

(22) Filed: Jan. 4, 2002

(65) Prior Publication Data

US 2003/0128012 A1 Jul. 10, 2003

(51) Int. Cl.[7] .............................................. H01M 10/46
(52) U.S. Cl. ....................................................... 320/137
(58) Field of Search ................................. 320/110, 132, 320/135, 137, 138, 160

(56) References Cited

U.S. PATENT DOCUMENTS 3,745,366 A * 7/1973 Simon
RE29,579 E * 3/1978 Simon
5,777,455 A * 7/1998 Vickery et al.

* cited by examiner

*Primary Examiner*—Edward H. Tso
(74) *Attorney, Agent, or Firm*—Duckor Stradling & Metzger; Bernard L. Kleinke

(57) ABSTRACT

According to one embodiment of the present invention, there is provided an arrangement and method for providing power to an electrical system and to at least one auxiliary power outlet used to provide electrical power for auxiliary equipment, such as welding equipment, lighting equipment and other auxiliary electrical equipment, as well as providing a booster outlet to charge batteries such as vehicle batteries when the arrangement is used on board a vehicle. The arrangement and method utilizes an alternator used, in one embodiment, to charge at least one battery for the electrical system and switches the output of the alternator between a battery charging mode of operation and an auxiliary power mode of operation. The arrangement of the disclosed embodiment of the present invention includes a voltage regulator such, for example, as a pulse width modulation circuit for the alternator.

14 Claims, 3 Drawing Sheets

ELECTRICAL SYSTEM AUXILIARY POWER OUTLET ARRANGEMENT AND METHOD OF USING SAME

FIELD OF THE INVENTION

The present invention relates in general to a new and improved auxiliary power outlet arrangement for electrical systems, as well as a method of using it. More particularly, in a preferred embodiment, the invention relates to a new and improved vehicle electrical system auxiliary power outlet arrangement and method, wherein an auxiliary power outlet is provided for a vehicle electrical system for energizing auxiliary electrical devices, such as arc welding equipment, lighting systems, impact power tools, as well as a booster charging outlet to charge other vehicle batteries.

BACKGROUND OF INVENTION

Background Art

In the past, there have been a variety of different types and kinds of regulators and other types of arrangements for electrical systems as well as other types and kinds of power supplies. For example, reference may be made to the following U.S. Pat. Nos. 6,309,268B1; 6,236,192B1; 6,166,527; 6,130,828; 6,118,371; 6,118,186; 6,111,215; 6,087,816; 6,084,451; 6,064,186; 6,018,200; 5,461,602; 5,225,764; 5,111,373; 5,109,186; 4,882,664; 4,521,672; 4,521,671; 4,455,526; and 4,129,788.

In addition to providing such regulators and others controls, it has been found desirable to enable electrical systems such as vehicle electrical systems powered by batteries, to also power other auxiliary equipment, such as welding equipment, auxiliary lights, impact power tools, as well as booster charging outlets to charge other vehicle batteries. This is particularly important for service vehicles such as those used by fire departments, transportation companies or the like. In this regard, it is important for such vehicles to have on-board equipment to facilitate the repair of malfunctioning vehicles.

For example, service vehicles have been provided with on-board welding equipment which can be transported to a location of a vehicle in need of repair. The operator of the service vehicle uses the welding equipment to make repairs such as welding broken suspension parts, hinges or the like by utilizing the on-board welding equipment. Conventionally, on-board welding equipment such as an arc welder is powered by an on-board auxiliary power source. Such auxiliary on-board power sources are expensive and bulky to store on the vehicle when not in use.

DESCRIPTION OF THE DRAWINGS

The following is a description of the accompanying drawings.

DESCRIPTION OF A PREFERRED EMBODIMENT

Figure 1:
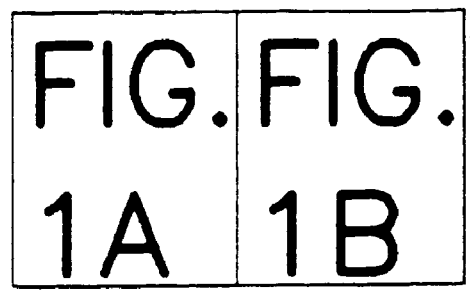
FIGS. 1A and 1B when arranged as shown in FIG. 1 illustrate a schematic circuit diagram of one embodiment of an auxiliary power outlet arrangement, which is constructed in accordance with one embodiment of the present invention.

According to one embodiment of the present invention, there is provided an arrangement and method for providing power to an electrical system and at least one auxiliary power outlet used to provide electrical power for auxiliary equipment, such as welding equipment, lighting equipment and other auxiliary electrical equipment, as well as providing a booster outlet to charge other batteries such as vehicle batteries when the arrangement is used on board a vehicle. The arrangement and method utilizes an alternator used, in one embodiment, to charge at least one battery for the electrical system and switches the output of the alternator between a battery charging mode of operation and an auxiliary power mode of operation. The arrangement of the disclosed embodiment of the present invention includes a voltage regulator such, for example, as a pulse width modulator for the alternator.

For the purposes of switching from the battery charging mode of operation to the auxiliary power mode of operation, the arrangement of a preferred embodiment of the invention includes a switching circuit which switches the output of the alternator to energize the auxiliary power outlet. The voltage regulator controls the output of the alternator to provide the desired voltage at the auxiliary outlet to accommodate the electrical characteristics of the auxiliary electrical equipment to be energized when connected to the outlet.

In a present embodiment of the invention, when use of the auxiliary power ceases for greater than a preset time period, the timer changes the alternator output to be compatible with the host electrical system, thereby charging its battery until such time as auxiliary power is again required.

The switching circuit of one preferred form of the present invention includes switching transistors such, for example, as MOS field effect transistors (FETs) connected in parallel to reduce the resistance when they are conducting. In this manner, the arrangement disclosed herein is highly efficient and low loss in operation.

In a preferred embodiment, the pulse width modulator protects the switching transistors (FETs) from open circuit or light load voltages by regulating the output voltage of the alternator below the breakdown voltage level of the switching transistors. Thus, for at least some applications, less expensive lower-voltage FETs may be employed, and yet the full current capability of the alternator may be employed for certain applications, such as arc welding, without exceeding the breakdown level of the FETs. Also, the pulse width modulator efficiently regulates the output of the alternator in both the battery charging mode and the auxiliary power mode.

The arrangement of a preferred embodiment of the present invention is in the form of a separate unit or box which is adapted to be mounted on a vehicle and connected electrically to the existing alternator and replaces the existing voltage regulator for the alternator. Alternatively, as will become apparent to those skilled in the art, another embodiment of the present invention is an original equipment or after market installation of a combination of a vehicle alternator with the other components of the auxiliary power outlet arrangement.

Referring now to the drawings, and more particularly to FIG. 1, there is shown an auxiliary power outlet arrangement 10, which is constructed in accordance with an embodiment of the present invention, and which may be used in connection with a vehicle alternator 12 to charge at least one vehicle battery 14 used to power a conventional electrical system (not shown) of a vehicle (not shown) and to power an arc welder (not shown). While the arrangement shown and described herein is adapted to power an arc welder, the arrangement can also be adjusted, according to another embodiment, to power lights, impact tools, as well as other electrical equipment as will become apparent to those skilled in the art. It is to be understood that a preferred embodiment of the present invention, which has been constructed and tested successfully, is adapted to be connected to existing vehicle alternators such as the alternator 12. However, it will become apparent to those skilled in the art that the arrangement of another embodiment of the present invention may be original equipment for the vehicle, or may be sold as after-market replacement equipment.

The arrangement 10 causes the alternator 12 to charge the battery 14 during a charging mode of operation when an ignition line 15 provides power to the field winding 27 of the alternator 12. An auxiliary power outlet 16 is energized by the output of the alternator 12 during an auxiliary power mode of operation, whereby electrical equipment (not shown) can be connected electrically to the outlet 16 and energized by the alternator 12. For the purposes of the present example of the invention as illustrated in FIGS. 1A and 1B, it is assumed that an arc welder (not shown) is adapted to be energized by the auxiliary power outlet 16 during the auxiliary power mode of operation of the arrangement 10.

A switching circuit generally indicated at 18 comprising a group of MOS field effect transistors (MOS FET) 21 and 23 connected in parallel, when conducting, connect the output of the alternator 12 to the plus terminal of the battery 14 for charging it. In one preferred embodiment, ten like MOS FET were connected in parallel. When the switching circuit 18 opens, the output of the alternator 12 is connected to the auxiliary power outlet 16 for energizing it electrically and the alternator output is altered to the appropriate level required for auxiliary power. The switching circuit 18 is energized automatically upon current being drawn from the power outlet 16. In this regard, once the arc welder (not shown) is energized electrically, current is provided from the alternator to the power outlet 16 and the current flow is sensed to cause the initialization of the switching circuit 18 to stop the charging of the battery 14. Once the current flow to the power outlet 16 stops for a predetermined period of time, the switching circuit 18 reverts back to its closed position to commence the charging of the host battery 14 as hereinafter described in greater detail. In this manner, should the user forget to start the charging mode of operation following a welding operation, the vehicle battery 14 would not be charged, and such a situation would, of course, be undesirable. Therefore, the arrangement 10 automatically switches back to the charging operation following the use of the auxiliary outlet 16.

A pulse width modulator 25 modulates the field winding 27 of the alternator 12 to serve as a voltage regulator during either the charging mode of operation or the auxiliary power mode of operation. In this regard, a Metal Oxide Semiconductor Field Effect Transistor (MOS FET) 29 is controlled by the pulse width modulator 25 to alter the average current flow to the field winding 27 in a pulse width modulation operation in an efficient manner. A MOS field effect transistor (MOS FET) 32 controls pin 2 of the pulse width modulator 25 for regulating the output of the alternator 12 to either about 14.7 volts for the charging mode of operation or about 40 volts for the welding operation is hereinafter described in greater detail in one example of the invention.

Figure 1A:
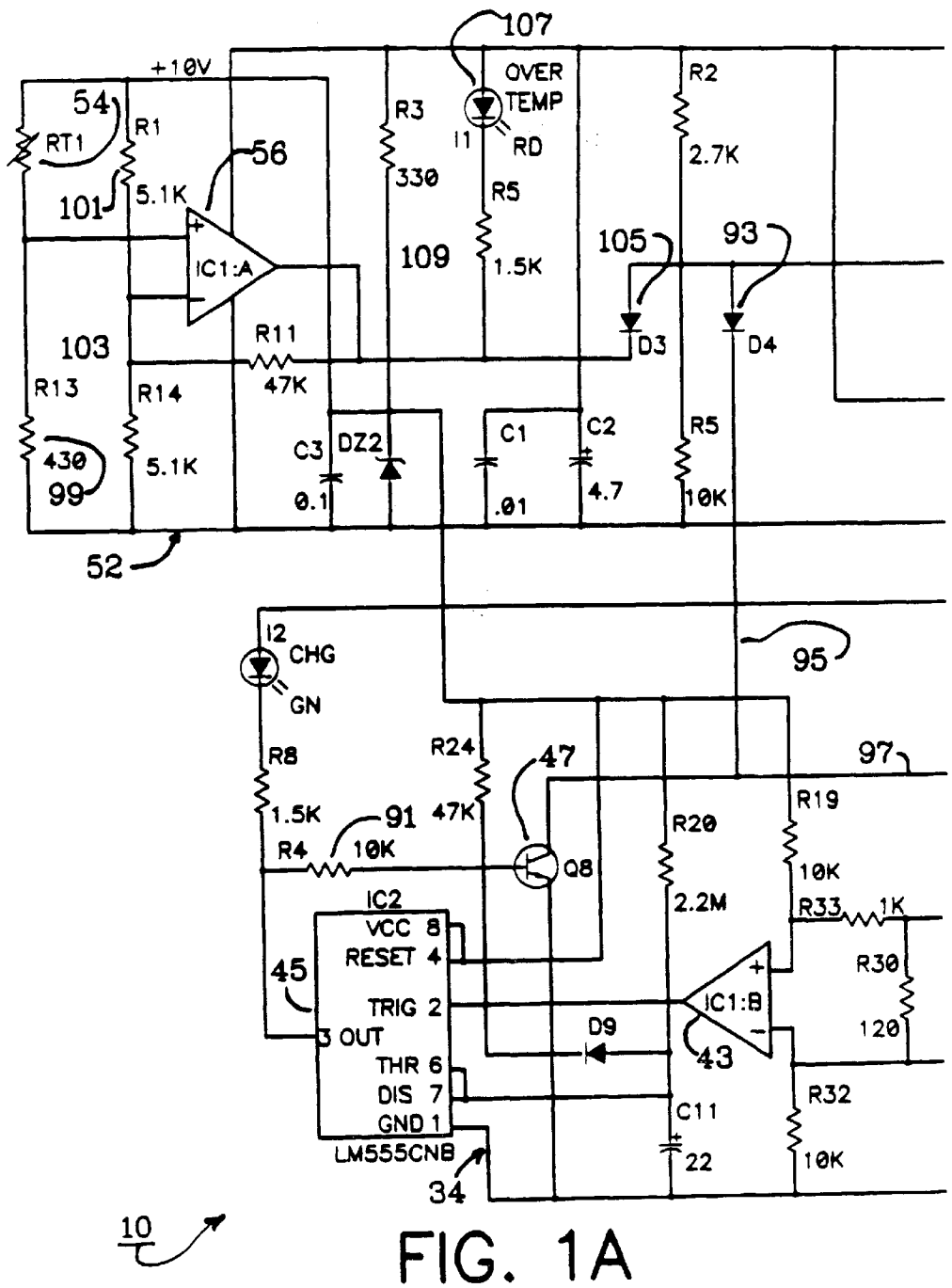
Figure 1B:
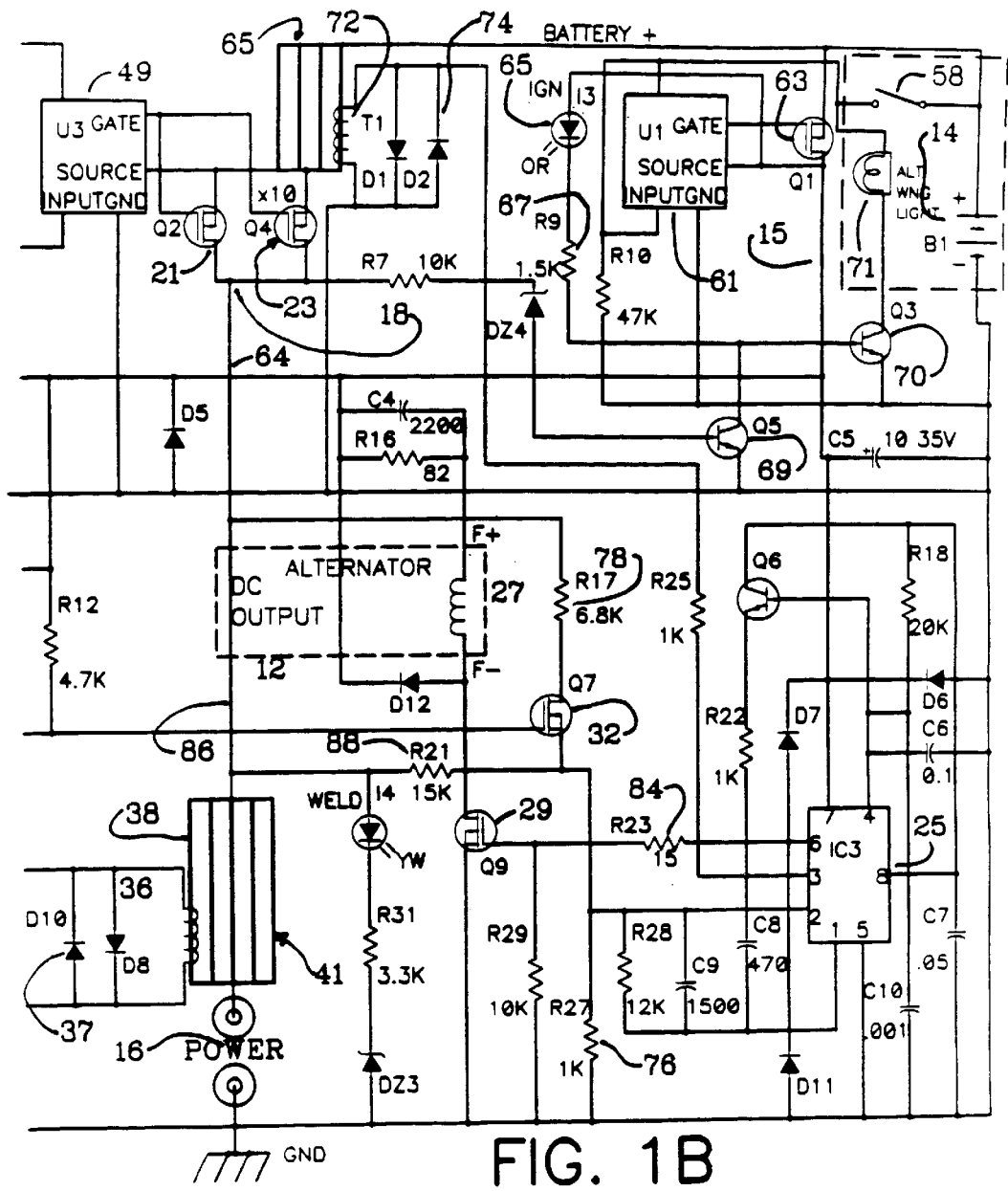

As shown in FIG. 1A, a welding detector and timing circuit generally indicated at 34 automatically switches when the welder is energized by the outlet 16. The circuit 34 includes a toroidal current sensor 36, connected in parallel with a pair of clamping diodes 37, sensing current flow in an outlet conductor 38 being one of a group of parallel connected outlet conductors 41 which provide a current flow between the output of the alternator 12 and the auxiliary power outlet 16. The parallel connected outlet conductors provide a low resistance path for the large current flow to the power outlet 16.

The circuit 34 also includes a voltage comparator 43 which is energized by the toroidal current sensor 36 sensing current flow to the outlet 16 to, in turn, energize a timer 45 which starts a predetermined timing interval starting with the sensing of the initial current flow to the power outlet 16 and renders conducting a transistor switch 47, which in turn triggers a driver circuit 49 for opening the switching circuit 18 for disconnecting the output of the alternator 12 to the battery 14 for preventing further charging of the battery during the use of the auxiliary power outlet 16 so that the full capacity of the alternator may be employed for the welding operation.

As shown in FIG. 1A, an over-temperature circuit 52 includes a thermister 54 for monitoring the temperature of the arrangement 10. A comparator 56 responds to the thermister 54 detecting a temperature greater than a predetermined temperature of 18 for causing the driver circuit 49 to open the switching circuit 18 to prevent charging of the battery 14, thus removing the current through circuit 18 until such time as the temperature of circuit 18 decreases to a suitable level. During that time, the over-temperature LED 107 will be illuminated.

As shown in FIG. 1B, a conventional vehicle ignition switch 58, when closed, causes the operation of a key-on relay 61 to be energized to close a MOS field effect transistor (MOS FET) switch 63 to connect the plus terminal of the battery 14 to the ignition line 15. The ignition line 15 then provides operating voltage for arrangement 10, as well as providing current flow from the battery 14 through the alternator field winding 27 and the FET 29 for energizing the alternator to cause it to charge the battery 14 via a battery charging line or path 64 including the switching circuit 18 and a group of parallel connected conductors 65. An ignition light emitting diode (LED) 66 is energized by the ignition line 15 to indicate that the ignition is in its ON condition and is energized by current flowing from the ignition line 15 through the light emitting diode 66, a current limiting resistor 67 and a transistor 69 to ground potential. A transistor switch 70 is energized by the current flow through the resistor 67 to close a circuit to an alternator warning light 71. It should be understood that the battery 14, the ignition switch 58 and the alternator warning light 71 are enclosed within broken lines to indicate the fact that they are mounted within the vehicle (not shown).

When current flows to the battery 14 for charging purposes, a toroidal current sensor 72 connected in parallel with a pair of clamping diodes 74 senses current in one of the conductors 65 for charging the battery 14 to provide a sense voltage via resistor 76 to pin 3 of the pulse width modulator 25 to activate it for modulating the current flow through the field winding 27 for limiting purposes.

During the battery charging mode of operation, the FET 32 is conducting and voltage divider resistors 76 and 78 control an internal comparator (not shown) of the pulse width modulator 25 to cause the modulator 25 to regulate the voltage of the alternator 12 to about 14.7 volts. In the preferred form of the present invention, the pulse width modulator 25 employs an integrated circuit chip UC 2843A which is implemented as shown in FIG. 1B of the drawings, but other modulators may be employed. The modulator 25 provides an output at its pin 6 through resistor 84 to the FET 29 to modulate the current through the field winding 27.

During the use of the auxiliary power outlet 16 for welding purposes, a welding current path 86 extends between the output of the alternator 12 through the group 41 of outlet conductors to the power outlet 16. A voltage divider resistor 88 is connected between the welding path 86 and the voltage divider resistor 76 to control the modulator 25 at its pin 2 to regulate the output of the alternator 12 to about 40 volts during open or light loads.

Should the output of the alternator 12 rise above about 40 volts, then the modulator 25 decreases the average current to the field winding 27 of the alternator 12 for effectively regulating its output voltage to a safe operating voltage for the arrangement 10. When an arc is being drawn by the welder requiring a large or maximum amount of current, then the alternator 12 will provide approximately 18 to 28 volts at or near the current capability of the alternator 12. It should be understood by those skilled in the art that when a different electrical device is connected to the auxiliary power outlet and suitable adjustments are made to the arrangement 10 as will become apparent to those skilled in the art, the modulator 25 can regulate the voltage linearly and limit the current for the particular device. In such a situation, the biasing for the modulator 25 would be adjusted accordingly.

When the welding commences, the current sensed by the toroidal current sensor 72 ceases due to the opening of the switching circuit 18. Whereas, the current sensed by the toroidal current sensor 36 and the welding detector and timing circuit 34 causes the voltage divider resistors 76 and 88 to control pin 2 of the modulator 25 to cause the modulator 25 to control the alternator 12 in a suitable manner for the higher voltage welding operation.

When the welding commences, the current flow sensed by the toroidal current sensor 36 causes the voltage comparator 43 to trigger the timer of 45, which in turn provides a signal through a current limiting resistor 91 to turn ON the transistor switch 47 for sending a signal via a lead or conductor 97 to render non-conducting the FET 32 for appropriately biasing the pin 2 of the modulator 25 via the voltage divider resistors 76 and 88 providing suitable power for the welding mode of operation.

When the transistor switch 47 conducts, the voltage at the anode of diode 93 is reduced below the level required to activate the driver 49} causing the switching circuit 18 to open-circuit to disconnect the output of the alternator 12 from the battery 14.

Considering now the over temperature circuit 52 in greater detail, the thermister 54 forms a voltage divider network with a resistor 99 to bias the negative input of the comparator 56. A pair of voltage divider resistors 101 and 103 bias the positive input to the comparator 56. A suitably poled diode 105 connects the output of the comparator 56 to the input to the circuit 49. A light emitting diode 107 is connected through a current limiting resistor 109 to the output of the comparator 56 to be illuminated when the over temperature condition occurs.

During a welding mode of operation, when the welding stops or otherwise becomes an open circuit, the modulator 25 regulates the alternator 12 to about 40 volts to protect the switching circuit 18 comprised of the MOS FET devices. Thus, according to one embodiment of the invention, it is possible to use low voltage FET devices which possess lower ON resistance, thus creating less heat, because the power being dissipated is equal to the current squared times the resistance of the $R_{DSON}$. This is the drain-to-source ON resistance.

The timer 45 keeps the battery 14 at its optimum conditioning, and prevents the user from forgetting to return to the charging mode of operation.

In a preferred embodiment of the invention as illustrated in the drawings, there is shown specific part numbers and values of the various components employed. It is to be understood that those skilled in the art may also employ other variations of components to implement other embodiments of the present invention.

While particular embodiments of the present invention have been disclosed, it is to be understood that various different modifications are possible and are contemplated within the true spirit and scope of the appended claims. For example, the preferred embodiment disclosed is a welder power source for vehicles, but it is to be understood that other applications, such as lighting, impact tools, grinders and others may also be employed by suitable modifications to the arrangement as will be understood by those skilled in the art. Also, arrangement and method is not limited to use on board vehicles, as will become apparent to those skilled in the art. There is no intention, therefore, of limitations to the exact abstract or disclosure herein presented.

What is claimed is:

1. An auxiliary power outlet arrangement for an alternator for charging at least one battery powering an electrical system, comprising:
    an auxiliary power outlet;
    at least one switch for switching electrically the output of the alternator to either the battery system or the power outlet; and
    a non-linear modulator for controlling the output of the alternator.

2. An arrangement according to claim 1, wherein said switch includes at least one field effect transistor.

3. An arrangement according to claim 2, further comprising at least one other field effect transistor connected in parallel with the first-mentioned field effect transistor.

4. An arrangement according to claim 1, further including a timer for causing the arrangement to switch from the auxiliary outlet to the battery system after a predetermined time delay interval following an interruption of current flow at the auxiliary power outlet.

5. An arrangement according to claim 1, further including a circuit for causing the switching of the arrangement from the auxiliary power outlet to the battery in response to the temperature of the arrangement exceeding a predetermined temperature.

6. An arrangement according to 1, further including means for causing said switch to disconnect the output of the alternator from the battery when current is being drawn at the auxiliary outlet.

7. An auxiliary power outlet arrangement for charging at least one battery powering an electrical system, comprising:
    an alternator for charging the electrical system;
    an auxiliary power outlet;
    at least one switch for switching electrically between the battery system and the power outlet; and
    a voltage regulator for regulating the voltage of the alternator during either the charging of the battery or the energization of the auxiliary power outlet.

8. An auxiliary power outlet arrangement for an alternator for charging at least one battery powering an electrical system, comprising:
    an auxiliary power outlet;
    means for switching electrically the output of the alternator to either the battery or the power outlet; and means for regulating the voltage of the alternator by non-linear modulation.

9. An arrangement according to claim 8, further including means for timing a predetermined time delay interval following an interruption of current flow at the auxiliary power outlet.

10. An arrangement according to claim 8, further including means for causing the switching of the arrangement from the outlet to the battery in response to the temperature of the arrangement exceeding a predetermined temperature.

11. An arrangement according to claim 8, further including means for causing said switch to disconnect the output of the alternator from the battery when current is being drawn at the auxiliary outlet.

12. A method of using an auxiliary power outlet arrangement for an alternator for charging at least one battery powering an electrical system, comprising:

using an auxiliary power outlet;

switching electrically the output of the alternator to either the battery system of the power outlet; and regulating the voltage of the alternator by non-linear modulation.

13. A method according to claim 1, further including a timer for causing the arrangement to switch from the auxiliary outlet to the battery system after a predetermined time delay interval following an interruption of current flow at the auxiliary power outlet.

14. A method, according to claim 1, further including a circuit for causing the switching of the arrangement from the auxiliary power outlet to the battery in response to the temperature of the arrangement exceeding a predetermined temperature.

* * * * *